United States Patent
Guy et al.

(10) Patent No.: US 8,524,823 B2
(45) Date of Patent: *Sep. 3, 2013

(54) RUBBER COMPOSITIONS COMPRISING ORGANOSILICON COUPLING AGENTS AND INORGANIC FILLERS

(75) Inventors: Laurent Guy, Rillieux la Pape (FR); Michel Fernandez, Lyons (FR); Sébastien Sterin, Saint Cyr au Mont (FR)

(73) Assignee: Rhodia Chimie, Aubervilliers (FR)

( * ) Notice: Subject to any disclaimer, the term of this patent is extended or adjusted under 35 U.S.C. 154(b) by 967 days.

This patent is subject to a terminal disclaimer.

(21) Appl. No.: 11/921,013

(22) PCT Filed: May 19, 2006

(86) PCT No.: PCT/FR2006/001142
§ 371 (c)(1), (2), (4) Date: Mar. 13, 2009

(87) PCT Pub. No.: WO2006/125896
PCT Pub. Date: Nov. 30, 2006

(65) Prior Publication Data
US 2009/0215948 A1    Aug. 27, 2009

(30) Foreign Application Priority Data
May 26, 2005    (FR) ..................................... 05 05288

(51) Int. Cl.
*C08K 3/36*    (2006.01)

(52) U.S. Cl.
USPC ........... 524/430; 524/571; 524/556; 524/567; 524/493; 524/526

(58) Field of Classification Search
USPC ................ 524/430, 571, 556, 567, 493, 526
See application file for complete search history.

(56) References Cited

U.S. PATENT DOCUMENTS

| | | | |
|---|---|---|---|
| 4,118,367 A * | 10/1978 | Dawes et al. | 524/575 |
| 5,866,261 A | 2/1999 | Kerr, III et al. | |
| 6,053,226 A * | 4/2000 | Agostini | 152/209.5 |
| 6,271,331 B1 | 8/2001 | Gay et al. | |
| 6,774,255 B1 * | 8/2004 | Tardivat et al. | 556/427 |
| 2003/0114601 A1 * | 6/2003 | Cruse et al. | 525/332.6 |
| 2003/0191225 A1 | 10/2003 | Tardivat et al. | |
| 2004/0181000 A1 | 9/2004 | Araujo-Da-Silva et al. | |
| 2005/0059773 A1 | 3/2005 | Tardivat et al. | |
| 2006/0116457 A1 | 6/2006 | Cambon et al. | |
| 2007/0082991 A1 | 4/2007 | Chassagnon et al. | |

FOREIGN PATENT DOCUMENTS

| | | |
|---|---|---|
| EP | 1221460 A2 | 7/2002 |
| FR | 2857972 A1 | 1/2005 |
| FR | 2861736 A1 | 5/2005 |
| WO | WO 2004/056918 A1 | 7/2004 |

* cited by examiner

*Primary Examiner* — Robert D. Harlan
(74) *Attorney, Agent, or Firm* — Dentons US LLP

(57) ABSTRACT

Elastomeric isoprene rubber compositions contain an effective amount of a coupling agent (A) comprising an organosilicon compound with coupling agent functions for inorganic/elastomeric fillers and include (B) at least one natural or synthetic rubber elastomer, (C) an inorganic filler as reinforcement filler, (D) other conventional constituents or additives comprising vulcanization agents; the coupling agent (A) being a functionalized organosilicon compound, including the following two compounds (i) and (2i), (i) being at least one functionalized siloxane corresponding to the formula (I): $[(G^0)_3SiO_{1/2}]_m\ [(G^0)_2SiO_{2/2}]_n\ [G^0SiO_{3/2}]_o\ [SiO_{4/2}]_p\ [(G^2)_a(G^1)_{a'}(Z-CO-N=N-CO-A)SiO_{(3-a-a')/2}]_q$ and (2i) being a mixture of at least one functionalized siloxane (i) with (3i) at least one functionalized organosilane also corresponding to formula (I) where m=n=o=p=0 (zero), q=1, a=0, 1, 2 or 3 and the sum a+a'=3.

17 Claims, No Drawings

US 8,524,823 B2

RUBBER COMPOSITIONS COMPRISING ORGANOSILICON COUPLING AGENTS AND INORGANIC FILLERS

CROSS-REFERENCE TO EARLIER APPLICATIONS

This application is the United States national stage of PCT/FR 2006/001142, filed May 19, 2006 and designating the United States (published in the French language on Nov. 30, 2006 as WO 2006/125896 A1; the title and abstract were also published in English), which claims priority under 35 U.S.C. §119 of FR 05/05288, filed May 26, 2005, each hereby expressly incorporated by reference in its entirety and each assigned to the assignee hereof.

The field of the present invention is that of the use of a functionalized organosilicon compound bearing at least one activated azo function, as coupling agent (white filler-elastomer) in rubber compositions comprising an inorganic filler as reinforcing filler. The invention also relates to the elastomer compositions obtained by means of using said coupling agent, and also to elastomeric articles having a body comprising the abovementioned compositions.

The types of elastomeric articles in which the invention is most useful are those that are especially subject to the following stresses: temperature variations and/or large-frequency stress variations in a dynamic regime; and/or a substantial static stress and/or a large strain fatigue in a dynamic regime. Such types of articles are, for example: seals for household electrical appliances, supports acting as engine vibration extractors either with metallic armatures or with a hydraulic fluid inside the elastomer, cable sheaths, shoe soles and rollers for cable cars.

This has especially been made possible by virtue of the development of novel elastomeric compositions reinforced with specific inorganic fillers termed "reinforcing" fillers, of high dispersibility, which are capable of competing with conventional carbon black from a reinforcing viewpoint, and which also offer these compositions lower hysteresis, which is especially synonymous with a reduction in the internal heating of the elastomeric articles (for example such as those mentioned above) during their use, in service.

The implementation (or "processability") of rubber compositions containing such fillers nevertheless remains more difficult than for rubber compositions conventionally filled with carbon black. In particular, it is necessary to use a coupling agent, also known as a binder, whose function is to ensure the connection between the surface of the inorganic filler particles and the elastomer, while at the same time facilitating the dispersion of this inorganic filler in the elastomeric matrix.

It is recalled here that the term "coupling agent" (inorganic filler-elastomer) should be understood as meaning, in a known manner, an agent capable of establishing a sufficient connection, of chemical and/or physical nature, between the inorganic filler and the elastomer.

Such a coupling agent, which is at least bifunctional, has the simplified general formula "Y—W—X", in which:
  Y represents a functional group (function "Y") capable of physically and/or chemically bonding to the inorganic filler, such a bond possibly being established, for example, between a silicon atom of the coupling agent and the surface hydroxyl (OH) groups of the inorganic filler (for example the surface silanols when it is silica);
  X represents a functional group (function "X") capable of physically and/or chemically bonding to the elastomer, for example via a suitable atom or group of atoms;
  W represents a divalent group allowing "Y" and "X" to be connected.

Coupling agents should in particular not be confused with simple agents for covering the inorganic filler, which, in a known manner, may comprise the function "Y" that is active towards the inorganic filler, but which in any case lack the function "X" that is active towards the elastomer.

Coupling agents, especially (silica-elastomer), have been described in a large number of patent documents, the most well known being bifunctional sulfurous silanes, in particular sulfurous alkoxysilanes, which are at the present time considered as being products that provide, for silica-charged vulcanizates, the best compromise in terms of scorching safety, ease of use and reinforcing power. Among these sulfurous silanes, mention should be made most particularly of bis(3-triethoxysilylpropyl) tetrasulfide (abbreviated as TESPT), which is the reference coupling agent in rubber compositions comprising an inorganic filler as reinforcing filler.

It is still sought at the present time to improve the performance qualities of these coupling agents for an inorganic filler such as, for example, silica.

In particular, the need is particularly present in the case of rubber matrices based on an isoprene elastomer in which, in a known manner, an effective bond with the elastomer is much more difficult to obtain, when compared with the use of carbon black.

While pursuing its research, the Applicant has discovered a novel coupling agent for inorganic filler that makes it possible to very significantly improve, in the presence of an isoprene elastomer, the hysteresis properties of the rubber compositions, which are manifested for the elastomeric articles (such as, for example, those mentioned above) in a reduction in the internal heating of these articles during their use, in service, or in an increase in the transmissibility factor in the case of antivibration parts in engine supports.

FIRST SUBJECT OF THE INVENTION

This objective, among others, is achieved by the present invention, which concerns, in a first subject, the use:
  of an effective amount of a coupling agent (A) (inorganic filler-elastomer) comprising a functionalized organosilicon compound bearing at least two functions noted "X" or "Y", which may be grafted on the one hand onto the elastomer by means of the function "X", and on the other hand onto the inorganic filler by means of the function "Y";
  as inorganic filler-elastomer coupling agent in rubber compositions comprising:
    (B) at least one elastomer of natural or synthetic rubber type;
    (C) an inorganic filler as reinforcing filler;
    (D) all or part of the other constituents or additives chosen from: one (or more) curing agent(s) (D1), optionally one (or more) curing accelerator(s) (D2), optionally one (or more) curing activator(s) (D3), optionally one (or more) non-white reinforcing filler(s) (D4), optionally one (or more) non-reinforcing or sparingly reinforcing inorganic filler(s) (D5), optionally one (or more) protecting agent(s) (D6), optionally one (or more) plasticizer(s) (D7), and mixtures of these species;
  said use being characterized in that:
    the coupling agent (A) is chosen from the group of coupling agents in which each member is a compound constituted essentially of a functionalized organosilicon compound consisting of the following species (i) and (2i):

(i) being at least one functionalized siloxane oligomer corresponding to the following formula (I):

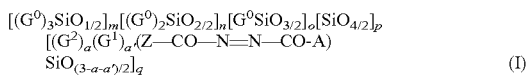
$$[(G^2)_a(G^1)_{a'}(Z-CO-N=N-CO-A)$$
$$SiO_{(3-a-a')/2}]_q \quad (I)$$

in which:
a represents an integer chosen from 0, 1 and 2;
a' represents an integer chosen from 0, 1 and 2;
the sum a+a' is in the range from 0 to 2, with the condition according to which when a=0, then at least one of the symbols $G^0$ corresponds to the definition given below for $G^2$;
either at least one of the m, n, o and p is an integer or fraction other than 0 (zero) and q represents an integer or fraction greater than or equal to 1, or q is greater than 1 and each of the m, n, o and p has any value;
the symbols $G^0$, which may be identical or different, each represent one of the groups corresponding to $G^2$ or $G^1$;
the symbols $G^2$, which may be identical or different, each represent: a hydroxyl group or a hydrolyzable monovalent group;
the symbols $G^1$, which may be identical or different, each represent: a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based part and a carbocyclic part as defined above; with the additional possibility according to which, where appropriate, a group $G^1$ may form, with a group $G^2$ and the silicon atom to which $G^1$ and $G^2$ are attached, a monocyclic or polycyclic carbocyclic group containing from 2 to 10 ring carbon atoms and possibly comprising one or more ring oxygen heteroatom(s);
the symbol Z represents a divalent radical chosen from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based part and a carbocyclic part as defined above; said divalent radical being optionally substituted or interrupted with an oxygen atom and/or a sulfur atom and/or a nitrogen atom, said nitrogen atom bearing one monovalent group chosen from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based part and a carbocyclic part as defined above;
the symbol A represents:
 a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based part and a carbocyclic part as defined above;
 a group —X-$G^3$ in which: X represents —O—, —S— or —NG$^4$- with $G^4$ taking any of the meanings given above for $G^1$; $G^3$, which may be identical to or different from $G^4$, represents any of the groups defined for $G^1$; the substituents $G^3$ and $G^4$ of the group —NG$^4G^3$ also possibly forming, together with the nitrogen atom to which they are attached, a single 5- to 7-membered ring comprising in the ring from 3 to 6 carbon atoms, 1 or 2 nitrogen atom(s) and optionally 1 or 2 unsaturated double bond(s);
or, when q=1, a group
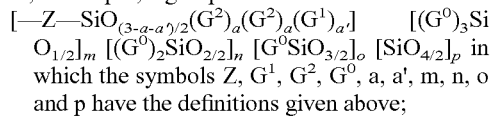
which the symbols Z, $G^1$, $G^2$, $G^0$, a, a', m, n, o and p have the definitions given above;
(2i) being a mixture of at least one functionalized siloxane (i) with (3i) at least one functionalized organosilane corresponding to the formula (I) in which m=n=o=p=0 (zero), q=1, a becomes an integer chosen from 0, 1, 2 and 3 and the sum a+a'=3;
said coupling agent (A) is incorporated into rubber compositions based on isoprene elastomers.

As regards the functionalized siloxane oligomers corresponding to formula (I), those that are advantageously targeted in the present invention are the species (i) corresponding to the definitions given above, in formula (I), in which the sum m+n+o+p+q (corresponding to the number of silicon atoms in the oligomer) is in the range from 2 to 20 and preferably from 2 to 12, for example from 2 to 6.

In the abovementioned formula (I), it should be understood that the group (Z—CO—N=N—CO-A) is linked to the Si atom of the unit $SiO_{(3-a-a')/2}$ via the divalent radical —Z—.

In the abovementioned formula (I), the function "X" of the coupling agent is the activated azo function CO—N=N—CO, whereas the function "Y" is a hydroxyl/hydrolyzable function —Si-$G^0$ and/or —Si-$G^2$.

In the text appearing above, the term "aliphatic hydrocarbon-based group" means an optionally substituted linear or branched group preferably containing from 1 to 25 carbon atoms.

Advantageously, said aliphatic hydrocarbon-based group contains from 1 to 18 carbon atoms, better still from 1 to 8 carbon atoms and even better still from 1 to 6 carbon atoms.

Saturated aliphatic hydrocarbon-based groups that may be mentioned include alkyl groups such as methyl, ethyl, propyl, isopropyl, n-butyl, isobutyl, t-butyl, pentyl, isopentyl, neopentyl, 2-methylbutyl, 1-ethyl-propyl, hexyl, isohexyl, neohexyl, 1-methylpentyl, 3-methylpentyl, 1,1-dimethylbutyl, 1,3-dimethylbutyl, 2-ethylbutyl, 1-methyl-1-ethylpropyl, heptyl, 1-methyl-hexyl, 1-propylbutyl, 4,4-dimethylpentyl, octyl, 1-methylheptyl, 2-ethylhexyl, 5,5-dimethylhexyl, nonyl, decyl, 1-methylnonyl, 3,7-dimethyloctyl, 7,7-dimethyl-octyl and hexadecyl radicals.

The unsaturated aliphatic hydrocarbon-based groups comprise one or more unsaturations, preferably one, two or three unsaturations of ethylenic type (double bond) and/or acetylenic type (triple bond).

Examples of these are alkenyl or alkynyl groups derived from the alkyl groups defined above by removal of two or more hydrogen atoms. Preferably, the unsaturated aliphatic hydrocarbon-based groups comprise only one unsaturation.

In the context of the invention, the term "carbocyclic group" means an optionally substituted monocyclic or polycyclic radical, preferably of $C_3$-$C_{50}$. Advantageously, it is a $C_3$-$C_{18}$ radical, which is preferably mono-, bi- or tricyclic. When the carbocyclic group comprises more than one ring nucleus (in the case of polycyclic carbocycles), the ring nuclei are fused in pairs. Two fused nuclei may be ortho-fused or peri-fused.

Unless otherwise indicated, the carbocyclic group may comprise a saturated part and/or an aromatic part and/or an unsaturated part.

Examples of saturated carbocyclic groups are cycloalkyl groups. Preferably, the cycloalkyl groups are of $C_3$-$C_{18}$ and better still $C_5$-$C_{10}$. Mention may be made especially of cyclopentyl, cyclohexyl, cycloheptyl, cyclooctyl, adamantyl and norbornyl radicals.

The unsaturated carbocycle or any unsaturated part of carbocyclic type contains one or more ethylenic unsaturations, preferably one, two or three. It advantageously contains from 6 to 50 and better still from 6 to 20 carbon atoms, for example from 6 to 18 carbon atoms. Examples of unsaturated carbocycles are $C_6$-$C_{10}$ cycloalkenyl groups.

Examples of aromatic carbocyclic radicals are ($C_6$-$C_{18}$) aryl and better still ($C_6$-$C_{12}$)aryl groups and especially phenyl, naphthyl, anthryl and phenanthryl.

A group containing both a hydrocarbon-based aliphatic part as defined above and a carbocyclic part as defined above is, for example, an arylalkyl group such as benzyl, or an alkylaryl group such as tolyl.

The substituents on the hydrocarbon-based aliphatic groups or parts and on the carbocyclic groups or parts are, for example, alkoxy groups in which the alkyl part is preferably as defined above.

The term "hydrolyzable monovalent group" that is concerned hereinabove as regards the symbols $G^2$ means groups such as, for example: halogen atoms, especially chlorine; groups —O-$G^5$ and —O—CO-$G^5$ in which $G^5$ represents: a saturated or unsaturated aliphatic hydrocarbon-based group, or a saturated, unsaturated and/or aromatic, monocyclic or polycyclic carbocyclic group, or a group containing a saturated or unsaturated aliphatic hydrocarbon-based part and a carbocyclic part as defined above, $G^5$ possibly being halogenated and/or substituted with one or more alkoxy groups; groups —O—N=C$G^6G^7$ in which $G^6$ and $G^7$ independently take any of the meanings given above for $G^5$, $G^6$ and $G^7$ possibly being halogenated and/or optionally substituted with one or more alkoxy groups; groups —O-N$G^6G^7$ in which $G^6$ and $G^7$ are as defined above.

Advantageously, such a hydrolyzable monovalent group is a radical as follows: linear or branched $C_1$-$C_8$ alkoxy optionally halogenated and/or optionally substituted with one or more ($C_1$-$C_8$)alkoxy; $C_2$-$C_8$ acyloxy optionally halogenated or optionally substituted with one or more ($C_1$-$C_8$) alkoxy; $C_5$-$C_{10}$ cycloalkyloxy; or $C_6$-$C_{18}$ aryloxy. By way of example, the hydrolyzable group is methoxy, ethoxy, n-propoxy, isopropoxy, n-butoxy, methoxymethoxy, ethoxyethoxy, methoxyethoxy, β-chloropropoxy, β-chloroethoxy or acetoxy.

As monovalent carbocyclic groups that may be formed, in formula (I), by the substituents $G^1$ and $G^2$ together and the silicon atom to which they are attached, mention will be made, for example, of the rings:

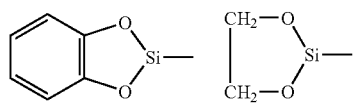

As single rings that may be formed by the substituents $G^3$ and $G^4$ together on the nitrogen atom present in the symbol A of formula (I), mention will be made, for example, of the following rings in which the free valency is borne by a nitrogen atom: pyrrole, imidazole, pyrazole, pyrrolidine, Δ2-pyrroline, imidazolidine, Δ2-imidazoline, pyrazolidine, Δ3-pyrazoline, piperidine; preferred examples are: pyrrole, imidazole and pyrazole.

Among the functionalized organosilicon compounds (A1), those that are suitable (compounds named SA1) are the compounds:
consisting of:
(i) functionalized siloxane oligomers corresponding to formula (I) in which: a+a'=1 or 2; m is in the range from 1 to 2; n=p=o=0 (zero); and q=1;
(2i) mixtures of species (i) with (3i) one (or more) functionalized organosilane(s) corresponding to formula (I) in which: a+a'=3; m=n=o=p=0 (zero); and q=1;
and of the structures for which:
the symbols $G^0$, which may be identical or different, each represent one of the radicals chosen below for $G^1$ or $G^2$
the symbols $G^1$, which may be identical or different, each represent: a linear or branched $C_1$-$C_8$ alkyl radical; a $C_5$-$C_{10}$ cycloalkyl radical or a $C_6$-$C_{18}$ aryl radical;
the symbols $G^2$, which may be identical or different, each represent: a hydroxyl radical or a linear or branched $C_1$-$C_8$ alkoxy radical, optionally substituted with one or more ($C_1$-$C_8$)alkoxy radicals;
Z represents the divalent radical —Z'—Z"— in which:
Z' represents: a $C_1$-$C_8$ alkylene chain; a saturated $C_5$-$C_{10}$ cycloalkylene group; a $C_6$-$C_{18}$ arylene group; or a divalent group consisting of a combination of at least two of these radicals;
Z" represents: a valency bond, —O— or —NR$^4$—, with R$^4$ being: a hydrogen atom; a linear or branched $C_1$-$C_8$ alkyl radical; a $C_5$-$C_{10}$ cycloalkyl radical; a $C_6$-$C_{18}$ aryl radical; or a ($C_6$-$C_{18}$)aryl-($C_1$-$C_8$)alkyl radical;
A denotes a group —O-$G^3$ or —N$G^4G^3$ in which $G^3$ and $G^4$, which may be identical or different, each represent: a linear or branched $C_1$-$C_8$ alkyl radical; a $C_5$-$C_{10}$ cycloalkyl radical or a $C_6$-$C_{18}$ aryl radical.

Among the functionalized organosilicon compounds (A), those that are more particularly suitable (compounds named SA2) are the compounds
consisting of:
(i) functionalized siloxane oligomers corresponding to formula (I) in which: a+a'=1 or 2; m is in the range from 1 to 2; n=p=o=0 (zero); and q=1;
(2i) mixtures of species (i) with (3i) one (or more) functionalized organosilane(s) corresponding to formula (I) in which: a+a'=3; m=n=o=p=0 (zero); and q=1;
and of the structures for which:
the symbols $G^0$, which may be identical or different, each represent one of the radicals chosen below for $G^1$ or $G^2$;
the symbols $G^1$, which may be identical or different, are chosen from the group formed by methyl, ethyl, propyl, isopropyl, cyclohexyl and phenyl radicals;
the symbols $G^2$, which may be identical or different, are chosen from the group formed by hydroxyl, methoxy, ethoxy, n-propoxy, isopropoxy, n-butoxy, methoxymethoxy, ethoxyethoxy and methoxyethoxy radicals;
Z represents the divalent radical —Z'—Z"— in which:
Z' represents: a $C_1$-$C_8$ alkylene chain;
Z" represents: a valency bond, —O— or —NR$^4$—, with R$^4$ being chosen from the group formed by: hydrogen and methyl, ethyl, propyl, isopropyl, n-butyl, isobutyl, t-butyl, pentyl, hexyl, cyclohexyl and benzyl radicals;

A denotes a group —O-G³ or —NG⁴G³ in which G³ and G⁴, which may be identical or different, are chosen from the group formed by methyl, ethyl, propyl, isopropyl, cyclohexyl and phenyl radicals.

Among the functionalized organosilicon compounds (A), those that are especially suitable (compounds named SA3) are the compounds:
consisting of:
(i) functionalized siloxane oligomers corresponding to formula (I) in which: a+a'=1 or 2; m is in the range from 1 to 2; n=p=o=0 (zero); and q=1;
(2i) mixtures of species (i) with (3i) one (or more) functionalized organosilane(s) corresponding to formula (I) in which: a+a'=3; m=n=o=p=0 (zero); and q=1;
and of the structures for which:
the symbols G⁰, which may be identical or different, each represent one of the radicals chosen below for G¹ or G²;
the symbols G¹, which may be identical or different, are chosen from the group formed by methyl, ethyl, propyl, isopropyl, cyclohexyl and phenyl radicals;
the symbols G², which may be identical or different, are chosen from the group formed by hydroxyl, methoxy, ethoxy, n-propoxy, isopropoxy and n-butoxy radicals;
Z represents the divalent radical —Z'—Z"— in which:
Z' is chosen from the group formed by the divalent radicals methylene, ethylene and propylene;
Z" represents: a valency bond, —O— or —NR⁴—, with R⁴ being a hydrogen atom;
A denotes a group —O-G³ in which G³ is chosen from the group formed by methyl, ethyl, propyl, isopropyl, cyclohexyl and phenyl radicals.

As examples of functionalized organosilicon compounds (A) that are especially suitable, mention will be made of the mixtures (2i) of the species (i) below:

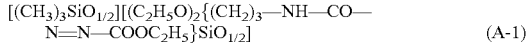
(A-1)

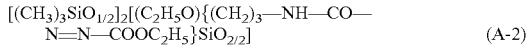
(A-2)

with the species (3i) below:

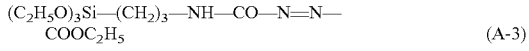
(A-3)

The functionalized organosilicon compounds (A) of the types (i) and (2i) may be prepared according to a synthetic process that consists in:
starting from a precursor reagent of formula (II) below:

(II)

oxidizing the hydrazo group of the precursor (II) using an oxidizing system comprising at least one oxidizing agent (for example a halogen, for instance bromine) and at least one base (for example a mineral base, for instance Na₂CO₃),
including an additional reagent chosen from a mono- or polyalkoxysilane (for example trimethylethoxy-silane), and
preferably working in an organic liquid medium (for example using a solvent such as dichloromethane).

One advantageous procedure for performing this process consists in:
placing in the reactor at room temperature (for example 23° C.): the precursor (II), the base (its amount depending on the oxidizing agent used; for example, in the case of bromine, two molar equivalents of base are used relative to the bromine), the organic solvent and the additional reagent (its amount corresponding, for example, to at least one molar equivalent relative to the precursor),
and then gradually adding to the reaction medium the oxidizing system (its molar amount being, for example, stoichiometric relative to that of the precursor).

With regard to the precursor of formula (II), it may be prepared according to a synthetic process in which a precursor silane of formula:

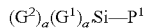

is reacted with a precursor hydrazo derivative of formula:

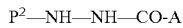

in which formulae the symbols G¹, G² and A are as defined above, a+a'=3 and P¹ and P² represent groups whose structure and functionality are such that these groups are capable of reacting with each other to give rise to the central chain —Z—CO— so as to lead to the hydrazo compound of formula:

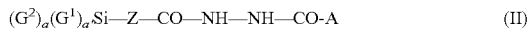
(II)

In the case, for example, of the preparation of the precursor of formula (II) in the structure of which the symbol Z then represents the divalent radical —(CH₂)₃—NH—, the synthetic scheme that is applied consists in reacting a precursor silane of formula:

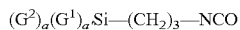

with a precursor hydrazo derivative of formula:

to give the hydrazo compound of formula:

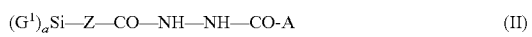
(II)

With regard to the practical manner of implementing the process just described for the precursor of formula (II), more details will be found in the content of FR-A-2340323.

A person skilled in the art understands that the coupling agents (A) described above may be pregrafted onto the reinforcing inorganic fillers, especially onto silica, via their function(s) "Y", the reinforcing inorganic fillers thus precoupled then possibly being bonded to the elastomer via their free function(s) "X". The coupling agents (A) may also be pregrafted onto the isoprene elastomer via their function(s) "X", the elastomer thus functionalized then possibly being bonded to the inorganic filler via their free function(s) "Y". It is preferred, however, especially for reasons of better use of the rubber compositions in crude form, to use all or part of the coupling agents either grafted onto the filler, or in free form (i.e. ungrafted).

SECOND SUBJECT OF THE INVENTION

A second subject of the present invention concerns compositions comprising:
(B) at least one isoprene elastomer,
(C) a reinforcing inorganic filler, and
(A) an adequate amount of the coupling agent consisting of the ingredient (A) described above.

More specifically, these compositions comprise (the parts being given on a weight basis):
per 100 parts of isoprene elastomer(s),
from 10 to 200 parts of inorganic filler (C), preferably from 30 to 150 parts and more preferentially from 40 to 120 parts, an amount of coupling system that provides in each composition 0.5 to 15 parts, preferably 1 to 10 parts and more preferentially 2 to 7 parts of ingredient (A).

Advantageously, the amount of ingredient (A), chosen in the abovementioned general and preferential regions, is determined such that it represents from 1% to 20%, preferably from 2% to 15% and more particularly from 3%

(2.5) a mixture of several of the above-mentioned monomers (2.1) to (2.4);

the polyisoprene copolymers containing between 99% and 20% by weight of isoprene units and between 1% and 80% by weight of diene, aromatic vinyl, vinyl nitrile and/or acrylic ester units, and consisting, for example, of poly(isoprene-butadiene), poly(isoprene-styrene) and poly(isoprene-butadiene-styrene);

(3) natural rubber;

(4) the copolymers obtained by copolymerization of isobutene and isoprene (butyl rubber), and also the halogenated versions, in particular the chlorinated or brominated versions, of these copolymers;

(5) a mixture of several of the above-mentioned elastomers (1) to (4);

(6) a mixture containing a major amount (ranging from 51% to 99.5% and preferably from 70% to 99% by weight) of abovementioned elastomer (1) or (3) and a minor amount (ranging from 49% to 0.5% and preferably from 30% to 1% by weight) of one or more diene elastomers other than isoprene elastomers.

The expression "diene elastomer other than isoprene elastomer" means, as is known: the homopolymers obtained by polymerization of one of the conjugated diene monomers defined above in point (2.1), for instance polybutadiene and polychloroprene; the copolymers obtained by copolymerization of at least two of the abovementioned conjugated dienes (2.1) with each other or by copolymerization of one or more of the abovementioned conjugated dienes (2.1) with one or more of the abovementioned unsaturated monomers (2.2), (2.3) and/or (2.4), for instance poly(butadiene-styrene) and poly(butadiene-acrylonitrile); ternary copolymers obtained by copolymerization of ethylene, of an α-olefin containing from 3 to 6 carbon atoms with a non-conjugated diene monomer containing from 6 to to 10% relative to the weight of the reinforcing inorganic filler.

We will return hereinbelow to the definitions of the compound (B) consisting of at least one isoprene elastomer, and of compound (C) consisting of a reinforcing inorganic filler.

The term "isoprene elastomers" that are used for the compositions in accordance with the second subject of the invention more specifically means:

(1) the synthetic polyisoprenes obtained by homopoly-merization of isoprene or 2-methyl-1,3-butadiene;

(2) the synthetic polyisoprenes obtained by copolymerization of isoprene with one or more ethylenically unsaturated monomers chosen from:

(2.1) conjugated diene monomers, other than isoprene, containing from 4 to 22 carbon atoms, for instance: 1,3-butadiene, 2,3-dimethyl-1,3-butadiene, 2-chloro-1, 3-butadiene (or chloroprene), 1-phenyl-1,3-butadiene, 1,3-pentadiene, 2,4-hexa-diene;

(2.2) aromatic vinyl monomers containing from 8 to 20 carbon atoms, for instance: styrene, ortho-, meta- or para-methylstyrene, the commercial mixture "vinyltoluene", para-tert-butylstyrene, methoxy-styrenes, chlorostyrenes, vinylmesitylene, divinyl-benzene, vinyl-naphthalene;

(2.3) vinyl nitrile monomers containing from 3 to 12 carbon atoms, for instance acrylonitrile or methacrylonitrile;

(2.4) acrylic ester monomers derived from acrylic acid or methacrylic acid with alkanols containing from 1 to 12 carbon atoms, for instance methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;

12 carbon atoms, for instance the elastomers obtained from ethylene or propylene with a non-conjugated diene monomer of the abovementioned type such as, especially, 1,4-hexadiene, ethylidene-norbornene, dicyclopentadiene (EPDM elastomer).

Use is preferentially made of one or more isoprene elastomers chosen from: (1) synthetic polyisoprene homopolymers; (2) synthetic polyisoprene copolymers consisting of poly(isoprene-butadiene), poly(isoprene-styrene) and poly(isoprene-butadiene-styrene); (3) natural rubber; (4) butyl rubber; (5) a mixture of the abovementioned elastomers (1) to (4); (6) a mixture containing a major amount of abovementioned elastomer (1) or (3) and a minor amount of diene elastomer other than isoprene elastomer consisting of polybutadiene, polychloroprene, poly(butadiene-styrene), poly-(butadiene-acrylonitrile) and a terpolymer (non-conjugated ethylene-propylene-diene monomer).

Use is more preferentially made of one or more isoprene elastomers chosen from: (1) synthetic polyisoprene homopolymers; (3) natural rubber; (5) a mixture of the abovementioned elastomers (1) and (3); (6) a mixture containing a major amount of abovementioned elastomer (1) or (3) and a minor amount of diene elastomer other than isoprene elastomer, consisting of polybutadiene and poly(butadiene-styrene).

In the present specification, the term "reinforcing inorganic filler" means, as is known, an inorganic or mineral filler, irrespective of its color and its origin (natural or synthetic), also known as a "white" filler or occasionally a "clear" filler, as opposed to carbon black. The expression "reinforcing inorganic filler" also includes in its definition mixed fillers based on "white" filler and on carbon black. This inorganic filler should be capable of reinforcing, by itself, without any means other than an intermediate coupling agent, a technical rubber composition, in other words capable of replacing, in its reinforcing function, a conventional filler based only on carbon black.

The reinforcing inorganic filler may be in any physical state, i.e. said filler may be in the form of powder, granules or beads (micropearls).

Preferentially, the reinforcing inorganic filler or compound (C) consists of silica, alumina, carbon black totally or partially covered with silica and/or alumina, or a mixture of these species.

More preferentially, the reinforcing inorganic filler consists of silica, taken alone or as a mixture with alumina.

As silicas that may be used in the invention, any precipitated silica or fumed silica (combustion silica) known to those skilled in the art, preferably having a BET specific surface area of less than or equal to 450 m$^2$/g, is suitable for use. Precipitated silicas are preferred, the latter possibly being standard or highly dispersible.

The term "highly dispersible silica" means any silica having a very high capacity for disintegration and dispersion in a polymer matrix, which may be observed by electron microscopy or optical microscopy, on thin slices. Among the highly dispersible precipitated silicas that may be used, for example, are those with a CTAB specific surface area of less than or equal to 450 m²/g and preferably between 30 and 400 m²/g, and in particular those described in U.S. Pat. No. 5,403,570 and patent applications WO-A-95/09127 and WO-A-95/09128, the contents of which are incorporated herein. As nonlimiting examples of such preferential highly dispersible precipitated silicas, mention may be made of the silicas Zeosil 1165 MP and 1115 MP from the company Rhodia, the silicas BV3380 and Ultrasil 7000 from the company Degussa, the silica Perkasil KS 430 from the company Akzo, the silicas Hi-Sil 2000 and Hi-Sil EZ 150G from the company PPG, the silicas Zeopol 8715, 8741, 8745 or 8755 from the company Huber. Treated precipitated silicas are also suitable for use, for instance the "aluminum-doped" silicas described in patent application EP-A-0 735 088, the content of which is also incorporated herein.

More preferentially, the precipitation silicas that are suitable for use are those having:
- a CTAB specific surface area of from 60 to 250 m²/g and preferably from 80 to 230 m²/g,
- a BET specific surface area of from 60 to 260 m²/g and preferably from 80 to 240 m²/g,
- a BET specific surface area/CTAB specific surface area ratio of from 1.0 to 1.6.

Needless to say, the term "silica" also means blends of different silicas. The CTAB specific surface area is determined according to the method NFT 45007 of November 1987. The BET specific surface area is determined according to the Brunauer-Emmett-Teller method described in "The Journal of the American Chemical Society, Vol. 60, page 309 (1938)" corresponding to the NF standard ISO 9277 of December 1996.

A reinforcing alumina that is advantageously used is a highly dispersible alumina having:
- a BET specific surface area of from 30 to 400 m²/g and preferably from 60 to 250 m²/g,
- a mean particle size of not more than 500 nm and preferably not more than 200 nm, and
- a high content of reactive surface Al—OH functions, for example as described in document EP-A-0 810 258.

As nonlimiting examples of such reinforcing aluminas, mention will be made especially of the aluminas A125, CR125 and D65CR from the company Baikowski.

As carbon blacks totally or partially covered with a "white" filler, mention will be made especially of the products of the Ecoblack range from the company Cabot, and in particular the product referenced CRX 2000.

As other examples of inorganic filler that may be used in the rubber compositions of the invention, mention may also be made of aluminum (oxide) hydroxides, aluminosilicates, titanium oxides, silicon carbides or nitrides, all of the reinforcing type as described, for example, in patent applications WO-A-99/28376, WO-A-00/73372, WO-A-02/053634, WO-A-2004/003067 and WO-A-2004/056915.

The compositions in accordance with the invention also contain an ingredient (D) comprising all or part of the other auxiliary additives and constituents usually used in the field of elastomer and rubber compositions.

Thus, all or some of the other constituents and additives below may be used:
as regards the curing system, mention may be made, for example, of:
- (D1): mandatorily, curing agents chosen from sulfur and sulfur-donating compounds, for instance thiuram derivatives; as regards sulfur, for example, it is used in a known manner at a content ranging from 0.5 to 10 and preferably from 0.5 to 5 parts by weight per 100 parts by weight of isoprene elastomer(s);
- (D2): optionally, curing accelerators, for instance guanidine derivatives and sulfenamide derivatives; such an activator, when one is used, is employed in a known manner in a content ranging from 0.5 to 10 and preferably from 0.5 to 5 parts by weight per 100 parts by weight of elastomer(s);
- (D3): optionally, curing activators, for instance zinc oxide, stearic acid and zinc stearate;

as regards other additive(s), mention may be made, for example, of:
- (D4): optionally, a conventional reinforcing filler consisting of carbon black; suitable carbon blacks include any carbon black, especially blacks of the type HAD, ISAF and SAF; nonlimiting examples of such carbon blacks that may be mentioned include the carbon blacks N115, N134, N234, N339, N347 and N375; the amount of carbon black is determined such that, on the one hand, the reinforcing inorganic filler used represents more than 50% of the weight of the inorganic filler+carbon black assembly, and, on the other hand, the total amount of reinforcing filler (inorganic filler+carbon black) remains within the ranges of values indicated above, for the reinforcing inorganic filler, with regard to the weight constitution of the compositions;
- (D5): optionally, a sparingly reinforcing or non-reinforcing conventional white filler, for instance clays, bentonite, talc, chalk, kaolin, titanium dioxide or a mixture of these species;
- (D6): optionally, protecting agents, for instance antioxidants and/or antiozonizers, for instance N-phenyl-N'-(1,3-dimethylbutyl)-p-phenylenediamine;
- (D7): optionally, plasticizers.

THIRD SUBJECT OF THE INVENTION

A third subject of the present invention concerns the process for preparing the elastomer compositions comprising a reinforcing inorganic filler and an effective amount of the coupling system. This process may be performed according to a standard procedure in two phases 1 and 2 in which:

phase 1 (known as the nonproductive "hot" step): all the necessary ingredients, with the general exception of the curing agent(s) (D1), are introduced into and blended in a standard internal mixer in one, two or more steps; by way of illustration, it is thus possible to introduce and blend all the ingredients defined below: elastomer(s) (B), inorganic filler (C), all or a part of the coupling agent (A), optionally one (or more) curing accelerator(s) (D2), optionally one (or more) curing activator(s) (D3), optionally one (or more) protecting agent(s) (D6), optionally one (or more) non-white reinforcing filler(s) (D4), optionally one (or more) sparingly reinforcing or non-reinforcing white filler(s) (D5), optionally one (or more) plasticizer(s) (D7); the process is performed at a temperature of between 40 and 200° C. and preferably between 60 and 180° C.; one or more subsequent step(s) of thermomechanical work may be performed in the internal mixer, after dropping the mixture and intermediate cooling (cooling temperature preferably less than 100° C.), for the purpose of subjecting the compositions to an additional thermomechanical treatment, especially to further improve the dispersion of the reinforcing inorganic filler and of the coupling agents in the elastomeric matrix; during such a subsequent step(s), it is possible to introduce one and/or the other of the necessary ingredients mentioned above;

phase 2 (referred to as the productive "cold" phase): the mixture thus obtained is then taken up in an external mixer and the curing agent(s) and optionally one or more other ingredient(s) is (are) added thereto; by way of illustration, the following ingredients are thus added:

optionally the rest of the coupling agent (A), one (or more) curing agent(s) (D1), optionally one (or more) curing accelerator(s) (D2), optionally one (or more) curing activator(s) (D3) optionally one (or more) protecting agent(s) (D6); the process is performed at a lower temperature, below 120° C. and preferably from 25 to 100° C.

Preferentially, the process for preparing the elastomeric compositions is performed according to the standard procedure in two phases 1 and 2 in which the coupling agent (A) is split between the two phases 1 and 2, the first fraction incorporated in phase 1 corresponding to a proportion of from 10% to 80% by weight, the second fraction incorporated in phase 2 corresponding to a proportion of from 90% to 20% by weight.

It should be noted that it is possible to introduce all or part of the coupling agents (A) in supported form (the placing on the support being performed beforehand) on a solid that is compatible with the chemical structures corresponding to these coupling agents; such a support consists especially of carbon black. For example, during the splitting of the coupling agents (A) over the two phases 1 and 2, it may be advantageous to introduce the coupling agent into the external mixer of phase 2 after placing said coupling agent on a support in order to facilitate its incorporation and dispersion.

The final composition obtained is then calendered, for example in the form of a sheet, a plaque or a profile that may be used for the manufacture of elastomeric articles.

The curing (or vulcanization) is performed, in a known manner, at a temperature generally ranging from 130 to 200° C., for a sufficient time that may range, for example, between 5 and 90 minutes as a function especially of the curing temperature, the curing system used and the curing kinetics of the composition under consideration.

It goes without saying that the present invention, taken in its second subject, concerns the elastomer compositions described above both in crude form (i.e. before curing) and in cured form (i.e. after crosslinking or curing).

FOURTH SUBJECT OF THE INVENTION

A fourth subject of the present invention concerns isoprene elastomeric articles having a body comprising the compositions described above in the context of the second subject of the invention. The present invention is particularly useful for preparing articles consisting, for example, of engine supports, shoe soles, rollers for cable cars, seals for electrical household appliances and cable sheaths.

The examples that follow illustrate the present invention.

EXAMPLE 1

This example illustrates the preparation of a coupling agent (A) of type (2i).

A 250 ml reactor is charged with 10 g (28.4 mmol, 1 eq) of the following compound 1:

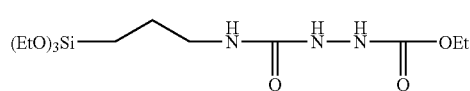

(Et=monovalent Ethyl radical)
and with 7.53 g (71 mmol, 2.5 eq) of dry $Na_2CO_3$ and 50 ml of a 50/50 (vol/vol) mixture of trimethyl-ethoxysilane and dichloromethane. A solution of 4.55 g of bromine (28.4 mmol, 1 eq) in 15 ml of dichloromethane is added dropwise over 1 hour. The reaction mixture is stirred for an additional 30 minutes after the end of the addition of the bromine.

The reaction mixture is subsequently filtered and then concentrated under vacuum. 9.77 g of a fluid bright orange liquid are obtained.

$^1$H NMR analysis shows that the compound 1 has been consumed completely, that the azo group has been formed selectively, and that the loss of SiOEt is limited.

The molar composition of the end product is indicated in table 1.

The end product obtained is a mixture of the silane species of formula:

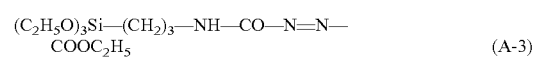

with the siloxane species of formulae:

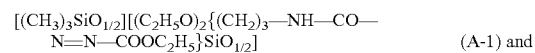

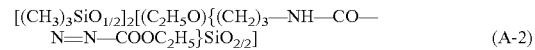

whose molar proportions are indicated in table 1 below.

TABLE 1

|  | Species (A-3) | Species (A-1) | Species (A-2) | Loss of SiOEt functions |
|---|---|---|---|---|
| Example 1 | 81% | 12% | 7% | 8.7% |

EXAMPLE 2

The aim of this example is to demonstrate the coupling performance qualities (white filler-elastomer) of the coupling agent (A) of type (2i) as prepared in example 1 given above.

These performance qualities are compared: firstly with that of a control rubber composition reinforced with a siliceous filler and not containing coupling agent; and secondly with that of another control composition reinforced with a siliceous filler and containing a conventional coupling agent based on the silane TESPT:

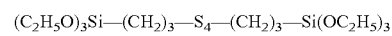

3 representative elastomer compositions of shoe sole formulations are compared. These 3 compositions are identical except for the following differences:
- composition 1 (control 1): reinforced with silica and not comprising coupling agent;
- composition 2 (control 2): reinforced with silica and comprising a coupling agent that is introduced totally into the internal mixer and gives the composition 4 pce of silane TESPT;
- composition 3: (example 2): reinforced with silica and comprising a coupling agent, split between internal mixer (1.5 pce) and external mixer (3.8 pce), that gives the composition 5.3 pce of coupling agent (A) of type (2i) as prepared in example 1 given above.

1) Constitution of the Elastomer Compositions:

The compositions whose constitution, expressed as parts by weight per 100 parts of elastomers (pce), is indicated in table 2 given below are prepared in an internal mixer of Brabender type:

TABLE 2

| Composition | Control 1 | Control 2 | Example 2 |
|---|---|---|---|
| NR (1) | 80 | 80 | 80 |
| BR (2) | 20 | 20 | 20 |
| Silica (3) | 50 | 50 | 50 |
| Coupling agent 1 (4) | — | 4.0 | — |
| Coupling agent 2 (5) | — | — | 1.5 |
| ZnO-80% | 3.75 | 3.75 | 3.75 |
| Stearic acid | 2.5 | 2.5 | 2.5 |
| Antioxidant (7) | 1.9 | 1.9 | 1.9 |
| Coupling agent 2 (5) | — | — | 3.8 |
| CBS-80% (8) | 1.88 | 1.88 | 1.88 |
| TBzTD (9) | 0.2 | 0.2 | 0.2 |
| Sulfur-80% | 1.88 | 1.88 | 1.88 |
| Carbon black (N330) | 4.0 | 4.0 | 4.0 |

Key:
(1) Natural rubber SMR - CV60 (supplied by the company Safic-Alcan).
(2) Polybutadiene or BR (Buna CB24 from the company Bayer) with 96% min of cis 1-4 and prepared by catalysis with neodymium.
(3) Silica (Z1165 MP from the company Rhodia) with BET and CTAB surface areas in the region of 150-160 m$^2$/g.
(4) TESPT (Silquest A1289 from the company GE-Osi).
(5) Coupling agent (A) of type (2i) as prepared in example 1 given above.
(6) N-1,3-Dimethylbutyl-N-phenyl-para-phenylenediamine (Santoflex 6-PPD from the company Flexsys).
(7) N-Cyclohexyl-2-benzothiazylsulfenamide (Rhenogran CBS-80 from the company Bayer)
(8) Tetrabenzylthiuram disulfide (Perkacit TBzTD from the company Flexsys).

The coupling agents are used in a silicon isomolar content, i.e. irrespective of the composition, the same number of moles of functions "Y" herein ["Y"=Si(OC$_2$H$_5$)], which are reactive with silica and its surface hydroxyl groups, are used.

2) Preparation of the Elastomer Compositions:

The process for preparing the elastomer compositions is performed in two successive preparation phases. A first phase consists of a phase of thermomechanical work at high temperature. It is followed by a second phase of mechanical work at temperatures below 110° C. This phase allows the introduction of the curing system.

The first phase is performed using a blending machine, such as an internal mixer of Brabender brand (volume of 70 ml). The filling coefficient is 0.75. The initial temperature and the rotor speed are set each time so as to achieve mixture drop temperatures in the region of 140-160° C.

This makes it possible to incorporate the elastomers, and then the reinforcing filler (split introduction) with all or part of the coupling agent, followed by the various curing activators (stearic acid, zinc oxide) and the protecting agent (6-PPD). For this phase, the duration is between 5 and 10 minutes.

After cooling the mixture (temperature below 100° C.), the second phase allows the introduction of the curing system (sulfur and accelerators) and optionally the rest of the coupling agent and a conventional reinforcing filler (carbon black). It is performed in a roll mixer preheated to 50° C. The duration of this phase is between 2 and 6 minutes.

It should be noted that, in the case of the splitting of the amount of coupling agent between the two mixers, the introduction of said coupling agent to the roll mixer is preferably carried out after it has been placed (beforehand) on a support with the carbon black.

The final composition is then calendered in the form of plaques 2-3 mm thick.

On these crude mixtures, an evaluation of their rheological properties makes it possible to optimize the duration and the curing temperature.

Next, the mechanical and dynamic properties of the optimally cured mixtures are measured.

3) Rheometry of the Compositions:

The measurements are taken on the compositions in crude form. Table II collates the results concerning the rheology test, which is performed at 150° C. using an ODR Monsanto 100 S rheometer according to standard DIN 53529.

According to this test, the composition to be tested is placed in the test chamber set at a temperature of 150° C. for 30 minutes, and the resistant torque, opposed by the composition, to an oscillation of weak amplitude (3°) of a biconical rotor included in the test chamber is measured, the composition completely filling the chamber under consideration.

From the curve of variation of the torque as a function of the time, the following are determined:

the minimum torque (Tm), which reflects the viscosity of the composition at the temperature under consideration;

the maximum torque (TM);

the delta-torque ($\Delta$T=TM−Tm) which reflects the degree of crosslinking entrained by the action of the crosslinking system and, if any, of the coupling agents;

the time T98 necessary to obtain a curing state corresponding to 98% of complete curing (this time is taken as the optimum curing time); and the scorch time TS2 corresponding to the time necessary to have a rise of 2 points above the minimum torque at the temperature under consideration (150° C.) and which reflects the time during which it is possible to use the crude mixtures at this temperature without having any initiation of curing.

The results obtained are indicated in table 3.

TABLE 3

| Reference | Control 1 | Control 2 | Example 2 |
|---|---|---|---|
| Tm (dN · m) | 27.2 | 17.33 | 22.06 |
| TM (dN · m) | 58.44 | 83.81 | 89.35 |
| Delta torque (dN · m) | 31.24 | 66.48 | 67.29 |
| TS 2 (min) | 7.98 | 7.62 | 7.35 |
| T98 (min) | 16.47 | 15.41 | 12.11 |
| Vcure max (dN · m/min) | 3.55 | 10.91 | 19.64 |

4) Mechanical Properties of the Cured Material:

The measurements are taken on the optimally cured compositions (T98) for a temperature of 150° C.

The uniaxial tensile tests are performed in accordance with the indications of standard NF T 46-002 with specimens of H2 type at a speed of 500 mm/min on an Instron 5564 machine. The 10%, 100% and 300% modulus values and the tensile strength are expressed in MPa; the elongation at break is expressed in %. It is possible to determine a reinforcing index from the ratio between the 300% modulus values and the modulus at 100% yield.

The Shore A hardness measurement on the cured materials is performed according to the indications of standard ASTM D 2240. The given value is measured at 15 seconds.

The measurement of the loss of mass by abrasion is performed according to the indications of standard DIN 53516, which uses a Zwick abrasimeter in which the cylindrical specimen is subjected to the action of an abrasive gauze of P60 grains and attached to the surface of a rotating drum at a contact pressure of 10N and over a course of 40 meters.

The value measured is a volume of loss of substance (in mm$^3$) after abrasion wear; the smaller the value, the better the abrasion resistance.

The properties measured are collated in table 4.

TABLE 4

| Reference | Control 1 | Control 2 | Example 2 |
|---|---|---|---|
| 10 modulus (MPa) | 0.76 | 0.89 | 0.86 |
| 100 modulus (MPa) | 1.46 | 3.14 | 3.37 |
| 200 modulus (MPa) | 2.92 | 7.65 | 10.01 |
| 300 modulus (MPa) | 5.58 | 13.12 | 18.27 |
| Tensile strength (MPa) | 20 | 28.7 | 26.5 |
| Elongation at break (%) | 657 | 567 | 410 |
| R.I. = 200/100 | 2.00 | 2.44 | 2.97 |
| R.I. = 300/100 | 3.82 | 4.18 | 5.42 |
| Shore A hardness-15 s (pts) | 51 | 63 | 61 |
| Loss on abrasion 10N (mm$^3$) | 221 | 76 | 63 |

5) Dynamic Properties of the Cured Materials:

The mechanical properties are measured on a viscoanalyzer (Metravib VA3000) according to standard ASTM D5952.

The values for the loss factor (tan δ) and the complex dynamic compression modulus (E*) are recorded on cured samples (cylindrical specimen of cross section 95 mm$^2$ and of height 14 mm). The sample is subjected at the start to a 10% prebend and then to a sinusoidal compression bend alternating by plus or minus 2%. The measurements are taken at 60° C. and at a frequency of 10 Hz.

The results, presented in table IV, are the complex compression modulus (E*-60° C.-10 Hz) and the loss factor (tan δ-60° C.-10 Hz).

The loss factor (tan δ) and amplitude of elastic modulus in dynamic shear (ΔG') values are recorded on cured samples (parallelepipedal specimen of cross section 8 mm$^2$ and of height 7 mm). The sample is subjected to a sinusoidal bend in alternating double shear at a temperature of 40° C. and at a frequency of 10 Hz. The strain amplitude scanning processes are performed according to a going/return cycle, going from 0.1% to 50% followed by a return from 50% to 0.1%.

The results presented in table 5 are obtained from the return strain amplitude scanning and concern the maximum value of the loss factor (tan δ max return-40° C.-10 Hz) and the amplitude of the elastic modulus (ΔG'-40° C.-10 Hz) between the values at 0.1% and 50% of strain (Payne effect).

TABLE 5

| Reference | Control 1 | Control 2 | Example 2 |
|---|---|---|---|
| E* - 60° C. - 10 Hz (MPa) | 8.10 | 8.28 | 7.39 |
| Tang δ - 60° C. - 10 Hz | 0.170 | 0.095 | 0.076 |
| Tang δ max return - 40° C. - 10 Hz | 0.192 | 0.143 | 0.120 |
| ΔG' - 40° C. - 10 Hz (MPa) | 2.25 | 2.33 | 1.72 |

Examination of the various results from table 3 straightaway shows, for the composition in accordance with the invention (example 2), in comparison with the control composition 2, significantly more rapid vulcanization kinetics, as illustrated by a Vret max value which is significantly superior (multiplied by 1.8).

After baking, the composition in accordance with the invention exhibits (table 4) substantially equivalent breaking properties; however, the highest values of the moduli under high deformation (MA100 and MA300) and for the ratio MA300/MA100 are clear indicators to a person skilled in the art of an improved reinforcement provided by the inorganic filler and the coupling agent according to the invention.

Finally and above all, the composition of the invention displays a significantly improved hysteresis, as demonstrated by the substantially reduced values of Tang δ-60° C. and of E*-60° C. (table 5).

The invention claimed is:

1. A rubber composition which comprises an isoprene elastomer and having incorporated therein:
   (A) an effective amount of a polyfunctional coupling agent system having at least two functions designated "X" or "Y", which may be grafted onto the elastomer by means of the function "X", and onto the inorganic filler by means of the function "Y";
   (B) at least one elastomer of rubber type, natural or synthetic;
   (C) an inorganic filler as reinforcing filler;
   (D) all or part of other constituents or additives selected from the group consisting of one or more curing agent(s) (D1), optionally, one or more curing accelerator(s) (D2), optionally, one or more curing activator(s) (D3), optionally, one or more non-white reinforcing filler(s) (D4), optionally, one or more non-reinforcing or sparingly reinforcing inorganic filler(s) (D5), optionally, one or more protecting agent(s) (D6), optionally, one or more plasticizer(s) (D7), and mixtures thereof; wherein said polyfunctional coupling agent system (A) comprising the combination of coupling agents in which each is a compound consisting essentially of a functionalized organosilicon compound selected from the group consisting of the following compounds (i) and (2i):
   (i) compounds comprising at least one functionalized siloxane oligomer corresponding to the following formula (I):

$$[(G^0)_3SiO_{1/2}]_m[(G^0)_2SiO_{2/2}]_n[G^0SiO_{3/2}]_o[SiO_{4/2}]_p$$
$$[(G^2)_a(G^1)_{a'}(Z-CO-N=N-CO-A)$$
$$SiO_{(3-a-a'\gamma/2)}]_q \qquad (I)$$

in which:
   a represents an integer selected from 0, 1 and 2;
   a' represents an integer selected from 0, 1 and 2;
   the sum a+a' ranges from 0 to 2, with the condition according to which when a=0, then at least one of the symbols G$^0$ has the definition below for G$^2$;
   either at least one of m, n, o and p is an integer or fraction other than 0 (zero) and q represents an integer or fraction greater than or equal to 1, or q is greater than 1 and each of the m, n, o and p has any value;
   the symbols G$^0$, which may be identical or different, each represent one of the groups corresponding to G$^2$ or G$^1$;
   the symbols G$^2$, which may be identical or different, each represent a hydroxyl group or a hydrolyzable monovalent group;
   the symbols G$^1$, which may be identical or different, each represent a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based moiety and a carbocyclic moiety as defined above; with the proviso that a group G$^1$ may together form, with a group G$^2$ and the silicon atom from which G$^1$ and G$^2$ depend, a monocyclic or polycyclic carbocyclic group having from 2 to 10 ring carbon atoms and optionally comprising one or more ring oxygen heteroatom(s);
   the symbol Z represents a divalent radical selected from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based moiety and a carbocyclic moiety as defined above; said divalent radical being optionally substituted or interrupted with an oxygen atom and/or a sulfur atom and/or a nitrogen atom, said nitrogen atom, if present, bearing one monovalent group selected from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based moiety and a carbocyclic moiety as defined above;

the symbol A represents:

a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based moiety and a carbocyclic moiety as defined above;

a group —X-$G^3$ in which: X represents —O—, —S— or —$NG^4$- wherein $G^4$ is as defined above for $G^1$; $G^3$, which may be identical to or different from $G^4$, represents any of the groups $G^1$; with the proviso that the substituents $G^3$ and $G^4$ of the group —$NG^4G^3$ may together from, with the nitrogen atom from which they depend, a single 5- to 7-membered ring having from 3 to 6 carbon atoms, 1 or 2 nitrogen atom(s) and, optionally, 1 or 2 unsaturated double bond(s);

or, when q=1, a group:

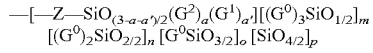

in which the symbols Z, $G^1$, $G^2$, $G^{0'}$, a, a', m, n, o and p have the definitions given above; and (2i) compounds comprising a mixture of at least one functionalized siloxane (i) with (3i) at least one functionalized organosilane corresponding to the formula (I) in which m=n=o=p=0 (zero), q=1, a is an integer selected from 0, 1, 2 and 3 and the sum a+a'=3.

2. The rubber composition as defined by claim 1, wherein said constituents (A) comprise coupling agents for which each member is an organosilicon compound consisting essentially of:

(i) functionalized siloxane oligomers corresponding to formula (I) in which: a+a'=1 or 2; m ranges from 1 to 2; n=p=o=0 (zero); and q=1;

(2i) mixtures of compounds (I) with (3i) one or more functionalized organosilane(s) corresponding to formula (I) in which: a+a'=3; m=n=o=p=0 (zero); and q=1;

and of the compounds wherein:

the symbols $G^0$, which may be identical or different, each represent one of the radicals defined below for $G^1$ or $G^2$;

the symbols $G^1$, which may be identical or different, each represent a linear or branched $C_1$-$C_8$ alkyl radical; a $C_5$-$C_{10}$ cycloalkyl radical or a $C_6$-$C_{18}$ aryl radical;

the symbols $G^2$, which may be identical or different, each represent a hydroxyl radical or a linear or branched $C_1$-$C_8$ alkoxy radical, optionally substituted with one or more ($C_1$-$C_8$)alkoxy radicals;

Z represents the divalent radical —Z'—Z"— in which:

Z' represents a $C_1$-$C_8$ alkylene radical; a saturated $C_5$-$C_{10}$ cycloalkylene radical; a $C_6$-$C_{18}$ arylene radical; or a divalent radical comprising a combination of at least two such radicals;

Z" represents a valency bond, —O— or —$NR^4$—, wherein $R^4$ is a hydrogen atom; a linear or branched $C_1$-$C_8$ alkyl radical; a $C_5$-$C_{10}$ cycloalkyl radical; a $C_6$-$C_{18}$ aryl radical; or a ($C_6$-$C_{18}$)aryl-($C_1$-$C_8$)alkyl radical;

A is a group —O-$G^3$ or —$NG^4G^3$ in which $G^3$ and $G^4$, which may be identical or different, each represent a linear or branched $C_1$-$C_8$ alkyl radical; a $C_5$-$C_{10}$ cycloalkyl radical or a $C_6$-$C_{18}$ aryl radical.

3. The rubber composition as defined by claim 1, wherein said constituents (A) comprise coupling agents for which each member is an organosilicon compound consisting essentially of:

(i) functionalized siloxane oligomers corresponding to formula (I) in which: a+a'=1 or 2; m ranges from 1 to 2; n=p=o=0 (zero); and q=1;

(2i) mixtures of compounds (i) with (3i) one or more functionalized organosilane(s) corresponding to formula (I) in which: a+a'=3; m=n=o=p=0 (zero); and q=1;

and of the compounds wherein:

the symbols $G^0$, which may be identical or different, each represent one of the radicals defined below for $G^1$ or $G^2$;

the symbols $G^1$, which may be identical or different, are selected from the group consisting of methyl, ethyl, propyl, isopropyl, cyclohexyl and phenyl radicals;

the symbols $G^2$, which may be identical or different, are selected from the group consisting of hydroxyl, methoxy, ethoxy, n-propoxy, isopropoxy, n-butoxy, methoxymethoxy, ethoxyethoxy and methoxyethoxy radicals;

Z represents the divalent radical —Z'—Z"— in which:

Z' represents a $C_1$-$C_8$ alkylene radical;

Z" represents a valency bond, —O— or —$NR^4$—, wherein $R^4$ is selected from the group consisting of hydrogen and methyl, ethyl, propyl, isopropyl, n-butyl, isobutyl, t-butyl, pentyl, hexyl, cyclohexyl and benzyl radicals;

A is a group —O-$G^3$ or —$NG^4G^3$ in which $G^3$ and $G^4$, which may be identical or different, are selected from the group consisting of methyl, ethyl, propyl, isopropyl, cyclohexyl and phenyl radicals.

4. The rubber composition as defined by claim 1, wherein said constituents (A) comprise coupling agents for which each member is an organosilicon compound consisting essentially of:

(i) functionalized siloxane oligomers corresponding to formula (I) in which: a+a'=1 or 2; m ranges from 1 to 2; n=p=o=0 (zero); and q=1;

(2i) mixtures of compounds (i) with (3i) one or more functionalized organosilane(s) corresponding to formula (I) in which: a+a'=3; m=n=o=p=0 (zero); and q=1;

and of the compounds wherein:

the symbols $G^0$, which may be identical or different, each represent one of the radicals defined below for $G^1$ or $G^2$;

a represents an integer equal to 3;

the symbols $G^1$, which may be identical or different, are selected from the group consisting of methyl, ethyl, propyl, isopropyl, cyclohexyl and phenyl radicals;

the symbols $G^2$, which may be identical or different, are selected from the group consisting of hydroxyl, methoxy, ethoxy, n-propoxy, isopropoxy and n-butoxy radicals;

Z represents the divalent radical —Z'—Z"— in which:

Z' is selected from the group consisting of the divalent radicals methylene, ethylene and propylene;

Z" represents a valency bond, —O— or —$NR^4$—, wherein $R^4$ is a hydrogen atom; and A is a group —O-$G^3$ in which $G^3$ is selected from the group consisting of methyl, ethyl, propyl, isopropyl, cyclohexyl and phenyl radicals.

5. An elastomeric composition comprising:
(B) at least one isoprene elastomer,
(C) a reinforcing inorganic filler, and
(A) an effective amount of the coupling system which comprises the combination of constituents (A1) and (A2) as defined by claim 1.

6. The elastomer composition as defined by claim 5, comprising (the parts being given on a weight basis):
per 100 parts of isoprene elastomer(s),
from 10 to 200 parts of inorganic filler (C),
an amount of combinations (A1)+(A2) that provides in each composition:
0.5 to 15 parts of constituent (A1), and
0.5 to 10 parts of constituent (A2).

7. The elastomer composition as defined by claim 6, comprising (the parts being given on a weight basis):
per 100 parts of isoprene elastomer(s),
from 30 to 150 parts of inorganic filler (C),
an amount of combinations (A1)+(A2) that provides in each composition:
1 to 10 parts of constituent (A1), and
0.8 to 8 parts of constituent (A2).

8. The elastomer composition as defined by claim 5, wherein the isoprene elastomer(s) is (are) selected from the group consisting of:
(1) the synthetic polyisoprenes obtained by homopolymerization of isoprene or 2-methyl-1,3-butadiene;
(2) the synthetic polyisoprenes obtained by copolymerization of isoprene with one or more ethylenically unsaturated monomers selected from the group consisting of:
(2.1) conjugated diene monomers, other than isoprene, containing from 4 to 22 carbon atoms;
(2.2) aromatic vinyl monomers having from 8 to 20 carbon atoms;
(2.3) vinyl nitrile monomers having from 3 to 12 carbon atoms;
(2.4) acrylic ester monomers derived from acrylic acid or methacrylic acid with alkanols having from 1 to 12 carbon atoms;
(2.5) a mixture of more than one of the above monomers (2.1) to (2.4);
the polyisoprene copolymers containing from 99% to 20% by weight of isoprene units and between 1% to 80% by weight of diene, aromatic vinyl, vinyl nitrile and/or acrylic ester structural units;
(3) natural rubber;
(4) the copolymers obtained by copolymerization of isobutene and isoprene (butyl rubber), and also the halogenated derivatives of these copolymers;
(5) a mixture of more than one of the above elastomers (1) to (4);
(6) a mixture containing a major amount ranging from 51% to 99.5% by weight of the above elastomer (1) or (3) and a minor amount ranging from 49% to 0.5% by weight of one or more diene elastomers other than isoprene elastomers.

9. The elastomer composition as defined by claim 8, comprising one or more isoprene elastomers selected from the group consisting of (1) synthetic polyisoprene homopolymers; (2) synthetic polyisoprene copolymers which comprise poly(isoprene-butadiene), poly(isoprene-styrene) or poly(isoprene-butadiene-styrene); (3) natural rubber; (4) butyl rubber; (5) a mixture of the above elastomers (1) to (4); (6) a mixture containing a major amount of above elastomer (1) or (3) and a minor amount of diene elastomer other than isoprene elastomer comprising polybutadiene, polychloroprene, poly(butadiene-styrene), poly(butadiene-acrylonitrile) or a terpolymer (non-conjugated ethylene-propylene-diene monomer).

10. The elastomer composition as defined by claim 5, wherein the reinforcing inorganic filler comprises silica, whether alone or as a mixture with alumina.

11. The elastomer composition as defined by claim 10, wherein:
the silica is a precipitated silica having a BET specific surface area of less than or equal to 450 $m^2/g$,
the alumina is a highly dispersible alumina having a BET specific surface area of from 30 to 400 $m^2/g$ and a high content of reactive surface Al—OH functions.

12. The elastomer composition as defined by claim 5, wherein it comprises other auxiliary additives or constituents which comprise:
as regards the curing system:
(D1): curing agents selected from the group consisting of sulfur and sulfur-donating compounds;
(D2): optionally, curing accelerators;
(D3): optionally, curing activators;
as regards other additive(s):
(D4): optionally, a conventional reinforcing filler comprising of carbon black;
(D5): optionally, a sparingly reinforcing or non-reinforcing conventional white filler;
(D6): optionally, protecting agents;
(D7): optionally, plasticizers.

13. A process for preparing the isoprene elastomer composition as defined by claim 5, comprising the following two phases 1 and 2:
phase 1: all the constituents, optionally with the exception of the curing agent(s), are introduced into and blended in an internal mixer, in one or more steps, at a temperature of from 40° to 200° C.;
phase 2: the mixture thus obtained is then transferred to an external mixer and the curing agent(s) and optionally one or more other ingredient(s) is (are) then added thereto, at a lower temperature, below 120° C.

14. The process as defined by claim 13, wherein:
the covering agent (A2) is introduced in total during phase 1 at the same time as the inorganic filler;
the coupling agent (A1) is:
either totally introduced during phase 1,
or totally introduced during phase 2,
or divided between the two phases 1 and 2, the first fraction incorporated in phase 1 corresponding to a proportion of from 10% to 80% by weight, the second fraction incorporated in phase 2 corresponding to a proportion of from 90% to 20% by weight.

15. An elastomeric shaped article comprising the composition as defined by claim 5.

16. The elastomeric shaped article as defined by claim 15, comprising an engine support, a shoe sole, a roller for cable cars, a seal for an electrical household appliance or a cable sheath.

17. The rubber composition of claim 1, where the symbol Z represents a divalent radical selected from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based moiety and a carbocyclic moiety as defined above; said divalent radical being optionally substituted or interrupted with an oxygen atom and/or a nitrogen atom, said nitrogen atom, if present, bearing one monovalent group selected from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based moiety and a carbocyclic moiety as defined above.

* * * * *